US012780450B2

(12) United States Patent
Raj et al.

(10) Patent No.: US 12,780,450 B2
(45) Date of Patent: Nov. 3, 2026

(54) ROBOTIC SPACE STATION SYSTEM FOR A MODULAR SURVEYING TELESCOPE

(71) Applicant: Arizona Board of Regents, Tucson, AZ (US)

(72) Inventors: Athip Thirupathi Raj, Tucson, AZ (US); Adrien Bouskela, Tucson, AZ (US); Jekan Thangavelautham, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 0 days.

(21) Appl. No.: 19/170,265

(22) Filed: Apr. 4, 2025

(65) Prior Publication Data

US 2025/0313349 A1 Oct. 9, 2025

Related U.S. Application Data

(60) Provisional application No. 63/574,799, filed on Apr. 4, 2024.

(51) Int. Cl.
*B64G 1/22* (2006.01)
*B64G 1/64* (2006.01)
*B64G 1/68* (2006.01)

(52) U.S. Cl.
CPC ........... *B64G 1/223* (2023.08); *B64G 1/6462* (2023.08); *B64G 1/68* (2013.01)

(58) Field of Classification Search
CPC ...... B64G 1/68; B64G 1/1028; B64G 1/1085; B64G 1/223; B64G 1/646; B64G 1/6462
See application file for complete search history.

(56) References Cited

U.S. PATENT DOCUMENTS

| | | | | |
|---|---|---|---|---|
| 11,971,300 | B1 * | 4/2024 | Aslam | G02B 17/0615 |
| 2018/0141683 | A1 * | 5/2018 | Leonard | B64G 1/10 |
| 2021/0263293 | A1 * | 8/2021 | Ducellier | H04B 10/503 |

OTHER PUBLICATIONS

Raj, A.T., Thangavelautham, J., Autonomous Logistics and Inventory Management in a Modular, Robotic, and Extensible Space Station, Ascend, Oct. 23-25, 2023, Las Vegas Nevada.
Raj, A.T., Thangavelautham, J., A Case for Space Platforms—A Comparative Analysis of Spacecraft Architectures for Deep Space Observation, AIAA SciTech Forum. Jan. 8-12, 2024, Orlando, FL, American Institute of Aeronautics and Astronautics, Inc.
SSI: Space Situational Awareness | The Aerospace Corporation. (n.d.). Aerospace Corporation. https://aerospace.org/ssi-space-situational-awareness.

(Continued)

*Primary Examiner* — Magdalena Topolski
*Assistant Examiner* — Anna L. Gordon
(74) *Attorney, Agent, or Firm* — Secant IP, PLLC; Edmund P. Pfleger

(57) ABSTRACT

A robotic space station system includes one or more interconnecting modules; a plurality of small satellites. Each small satellite further including: one or more docking adapters; and one or more telescopes; where: each of the plurality of small satellites is rotatably coupled to at least one of the one or more interconnecting modules via the one or more docking adapters along a central axis; and the plurality of small satellites configured to rotate independently about the central axis.

9 Claims, 7 Drawing Sheets

(56) References Cited

OTHER PUBLICATIONS

Ares | Orbital Debris Program Office | Photo Gallery. (n.d.). https://orbitaldebris.jscnasa.gov/photo-gallery/.
Kornuta, D.et al, (2019). Commercial lunar propellant architecture: A collaborative study of lunar propellant production. Reach, 13, 100026. https://doi.org/10.1016/j.reach.2019.100026.
Thangavelautham, J. (2020). Autonomous robot swarms for Off-World construction and resource mining. AIAA Scitech 2020 Forum. https://doi.org/10.2514/6.2020-0795.
Tran F. et al., Thematic Investing: To Infinity and Beyond—Global Space Primer, Bank of America Merryl Lynch Transforming World Thematic Research; Oct. 30, 2017.
Star, E. B. S. T. a. D. (Nov. 14, 2010). Catalina Sky Survey keeps eye out for wayward asteroids. Arizona Daily Star. https://tucson.com/special-section/catalina-sky-survey-keeps-eye-out-for-wayward-asteroids/article_a6514240-5806-5450-a471-08ea3d8ccd6e.html.
Betz, E. (Jun. 4, 2020). The history and future of telescopes on the moon. Discover Magazine. https://www.discovermagazine.com/the-sciences/the-history-and-future-of-telescopes-on-the-moon.
Mann, A. (Jul. 18, 2013). The private plan to put a telescope on the moon. Wired. https://www.wired.com/2013/07/moon-ex-iloa-telescope/.
Tabor, A. (Jul. 27, 2023). What is LCROSS, the Lunar Crater Observation and Sensing Satellite?—NASA. NASA. https://www.nasa.gov/general/what-is-lcross-the-lunar-crater-observation-and-sensing-satellite/.
Lunar Reconnaissance Orbiter. NASA's LRO (Lunar Reconnaissance Orbiter) is paving the way for human and robotic exploration of the Moon. (n.d.). https://science.nasa.gov/mission/lro/.
Rashed, M. I., & Bang, H. (2022). Design and optimization of an autonomous constellation of small-satellites for LEO and beyond. 36th Annual Small Satellite Conference. https://digitalcommons.usu.edu/cgi/viewcontent.cgi?article=5476&context=smallsat.
Lopez, F. et al., (2023). A Lunar-Orbiting satellite constellation for wireless energy supply. Aerospace, 10(11), 919. https://doi.org/10.3390/aerospace10110919.
Space Surveillance and Tracking—SST segment. (n.d.). https://www.esa.int/Space_Safety/Space_Surveillance_and_Tracking_-_SST_Segment.
Optical payload for space situational awareness in geosynchronous orbit—MIT Technology Roadmapping. (n.d.). https://roadmaps.mit.edu/index.php/Optical_Payload_for_Space_Situational_Awareness_in_Geosynchronous_Orbit.
The port | Arkisys. (n.d.). Arkisys. https://www.arkisys.com/the-port.
Hu, G. et al., (2023). Modular self-reconfigurable spacecraft: Development status, key technologies, and application prospect. Acta Astronautica, 207, 240-256. https://doi.org/10.1016/j.actaastro.2023.03.012.
Mosar. (n.d.). https://www.h2020-mosar.eu/.
Edwards, D. (Jan. 31, 2020). How robotics can be extremely beneficial to warehouse business. Robotics & Automation News. https://roboticsandautomationnews.com/2020/01/31/how-robotics-can-be-extremely-beneficial-to-warehouse-business/29344/.
Fink, P. W. et al., (2017). Autonomous logistics management systems for exploration missions. AIAA Space and Astronautics Forum and Exposition. https://doi.org/10.2514/6.2017-5256.
Blue Origin and Sierra Space Developing Commercial Space Station. Blue Origin. (Oct. 31, 2022). Retrieved Feb. 2023, from https://www.blueorigin.com/news/orbital-reef-commercial-space-station/.
Gough, E. (Dec. 19, 2019). Cool Photo of Canadarm2 With its Dextre Hand. Oh and the Earth. That's Nice Too.—Universe Today. Universe Today. https://www.universetoday.com/144421/cool-photo-of-canadarm2-with-its-dextre-hand-oh-and-the-earth-thats-nice-too/.
Otero, A. et al., (2003). Spheres: Development of an ISS Laboratory for formation flight and docking research. IEEE Conference on Aerospace. https://doi.org/10.1109/aero.2002.1036828.
Evans, W. A., et al., (2006). Logistics lessons learned in NASA space flight (No. NASA/TP-2006-214203).
Shkedi, B., & Thompson, D. S. (2004). ISS ECLSS: 3 Years of Logistics for Maintenance. SAE Technical Paper Series. https://doi.org/10.4271/2004-01-2388.
Morphew, E. (2020). Psychological and human factors in long duration spaceflight. McGill Journal of Medicine, 6(1). https://doi.org/10.26443/mjm.v6i1.555.
Zhang, Q. et al., (2022). Effects of human thermophysiology and psychology in exposure to simulated microgravity. Acta Astronautica, 201, 445-453. https://doi.org/10.1016/j.actaastro.2022.09.050.
Zhang, Z. et al., (2023). Modularity, reconfigurability, and autonomy for the future in spacecraft: A review. Chinese Journal of Aeronautics, 36(7), 282-315. https://doi.org/10.1016/j.cja.2023.04.019.
Akim, D. L. et al., (2006). MORPHbots: Lightweight Modular Self-Reconfigurable Robotics for Space Assembly, Inspection, and Servicing. AIAA Space. https://doi.org/10.2514/6.2006-7408.
Frueh, C. et al., (Feb. 2021). Cislunar space situational awareness. In 31st AIAA/AAS Space Flight Mechanics Meeting (pp. 6-7).
Crusan, J. et al., (2018). Deep space gateway concept: Extending human presence into cislunar space. IEEE Aerospace Conference 2018. https://doi.org/10.1109/aero.2018.8396541.
Rashed, M. I., & Bang, H. (2022). A study of autonomous small satellite constellations for disaster management and deep space strategy. Remote Sensing, 14(23), 6148. https://doi.org/10.3390/rs14236148.
Hu et al., (2022). Modular Self-Reconfigurable Satellite Inverse Kinematic Solution Method based on improved Differential Evolutionary Algorithm. Aerospace, 9(8), 434. https://doi.org/10.3390/aerospace9080434.
Lunar Reconnaissance Orbiter. Building hte LRO Spacecraft. (n.d.). https://science.nasa.gov/mission/lro/spacecraft-and-instruments/.

* cited by examiner

ROBOTIC SPACE STATION SYSTEM FOR A MODULAR SURVEYING TELESCOPE

CROSS-REFERENCE TO RELATED APPLICATIONS

The present application claims the benefit of the filing date of U.S. Provisional Application Ser. No. 63/574,799, filed Apr. 4, 2024, the entire teachings of which application is hereby incorporated herein by reference.

STATEMENT REGARDING FEDERALLY SPONSORED RESEARCH OR DEVELOPMENT

This invention was made with government support under Grant No. 80NSSC19M0197 awarded by NASA. The government has certain rights in the invention.

TECHNICAL FIELD

The present disclosure relates generally to a robotic space station system for a modular surveying telescope.

BACKGROUND

In the ever-evolving landscape of technological advancements and the intensifying competition in space exploration, the significance of Space Domain Awareness (SDA) has reached unprecedented levels. There is a growing importance of SDA, particularly in the cislunar domain, where human activities extend beyond Earth's orbit. The focus is on tracking satellites, detecting and tracking near-earth asteroids, managing space debris, and mitigating collision risks to maintain the sustainability of space operations. As humanity continues to push the boundaries of space exploration, the space environment has become increasingly congested, contested, and competitive. The growing number of satellites, space debris, near-earth asteroids, and other objects in orbit has raised concerns about potential collisions and the creation of more debris, a scenario known as the Kessler Syndrome. To address these challenges, the role of SDA has become pivotal in providing essential information for monitoring and regulating space traffic and mitigating the risks associated with the congestion of space. Continuously tracking the location of satellites and other objects in orbit enables operators to make informed decisions to avoid potential collisions. This not only ensures the safety of space assets but also enhances the overall efficiency of space operations. The information provided by SDA allows for precise orbital maneuvers, optimizing the positioning of satellite constellations and minimizing the probability of accidents. One of the primary concerns in the realm of space activities is the creation of the Kessler Syndrome. This domino effect of collisions, resulting in an ever-growing cloud of debris, poses a severe threat to both operational satellites and future space missions. SDA acts as a crucial tool in preventing the onset of the Kessler Syndrome by providing real-time data on the location of objects in space. This information enables operators to adjust trajectories and avoid potential collisions, thereby breaking the chain reaction that could lead to irreversible consequences.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
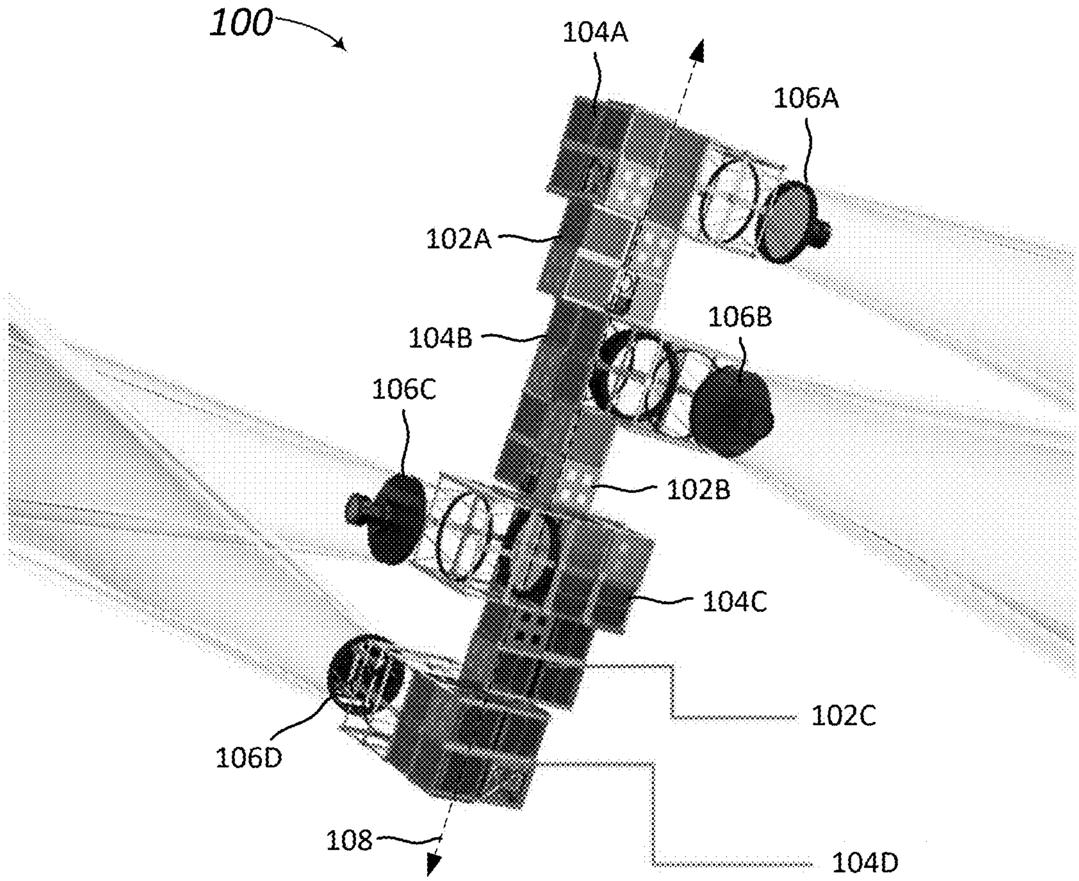
FIG. 1 is a perspective view of an illustrative example of a robotic space station system for a modular surveying telescope, consistent with the present disclosure.

The present disclosure is not limited in its application to the details of construction and the arrangement of components set forth in the following description or illustrated in the drawings. The examples described herein may be capable of other embodiments and of being practiced or being carried out in various ways. Also, it may be appreciated that the phraseology and terminology used herein is for the purpose of description and should not be regarded as limiting as such may be understood by one of skill in the art. Throughout the present disclosure, like reference characters may indicate like structure throughout the several views, and such structure need not be separately discussed. Furthermore, any particular feature(s) of a particular exemplary embodiment may be equally applied to any other exemplary embodiment(s) of this disclosure as suitable. In other words, features between the various exemplary embodiments described herein are interchangeable, and not exclusive.

Dedicated spacecraft have been used to complete surveys of stars in our galaxy, find significant number of near-earth asteroids, and monitor Earth satellites. Yet these systems are all dedicated spacecraft with high cost and non-standard construction, presenting a high barrier to the necessary increase in spacecraft fleets and capabilities. The use of dedicated spacecraft also limits access to underrepresented fields and narrows scientific community access to such equipment.

The present disclosure covers a novel robotic observation space station concept. It is assembled in space by docking standardized small satellites, e.g., CubeSats, with telescope payloads, forming a rotating truss-like structure optimized for full sky surveys. Station reconfiguration is built into robotic operations to answer multi-mission requirements and follow-up observations.

Both previous and current platforms demonstrated the advantages of a constantly rotating spacecraft for full sky surveys. With telescopes constantly panning through the sky, both high coverage and rapid revisit has been shown. The disclosed design presents a solution to the cost and complexity while introducing additional capabilities. Small satellite telescope units can operate independently or as part of a multi-agent system. Each unit may include both a 150 mm aperture telescope payload and one or more universal docking adapters as key components. Units are assemble in space such that each telescope points in a different direction with the main rotation axis normal to all optical axes. A slower precession of the rotation axis is either induced, or caused by the orbit of the space station. In addition, the disclosed system allows for independent rotation of each of the satellites to provide for coverage of a larger field of view (FoV) than fixed orientation satellites could provide.

The disclosed system builds on the existing idea of rotating spacecraft by going beyond one or two optical axes. As an unrestricted number of additional telescopes can be docked to the space station, it is possible to expand in both survey speed and observation type (e.g., supernova detection, near earth asteroids, space situational awareness, etc.). This is core to the multi-mission capability as a single space station can serve multiple scientific communities. As requirements change the space station can reconfigure autonomously, changing telescope tasking, or undocking a small satellite so it can temporarily focus on a specific target of interest. In addition, individual telescopes can be rotated independently to focus on the specific target of interest. The data handling is baked into the robotic system such that operations are mission focused.

The key to the disclosed concept is the in-space assembly and reconfiguration of telescope units. Such modularity allows for multimission applications without the need for multiple, independent, and costly spacecraft. For example, some number of telescopes can be surveying for near earth asteroids while others observe earth, and a yet others look at specific spectrum bands for events such as supernovas. The search for supernovas is currently a significant gap in surveying capabilities; the current state of the art depends primarily on amateurs and citizen science. The disclosed system is an all-in-one space station instead of multiple spacecraft, which are significantly more expensive in terms of launch cost and operations cost. The lower cost also opens the door to more users, e.g., a telescope could even be dedicated to student use.

Past disclosures from this team have presented a stationary station concept, while the current disclosure expands this concept with a rotating space station geared towards mission which may include, but are not limited to, surveying and follow-up observations. The main motivation of these missions are full sky observations of near-earth objects, which include asteroids for planetary defense, research, and other spacecraft.

Current capabilities for asteroids are ground based and/or expensive spacecraft that look at specific parts of the sky. Observations of other spacecraft typically are performed from the ground or earth orbit, and there is a lack of capability in the case of spacecraft in orbit or on route to the moon. The disclosed design of a rotating space station with deployable, independently rotating telescopes designed for surveying and dedicated cameras is a feasible answer to these challenges.

The present disclosure covers a novel robotic observation space station concept. It is assembled in space by docking standardized small satellites with telescope payloads, forming a rotating truss-like structure optimized for full sky surveys. Station reconfiguration is built into robotic operations to answer multi-mission requirements and follow-up observations.

FIG. 1 is a perspective view of an illustrative example of a robotic space station system 100 for a modular surveying telescope. The robotic space station system 100 may use a truss structure as a platform for the survey and study of Near-Earth Objects (NEO).

The multi-agent system may be constructed with standardized small satellites, e.g., CubeSat spacecraft, that may include a 150 mm aperture deployable telescope. The illustrative example of FIG. 1 includes four satellites, satellite-A 104A with telescope-A 106A, satellite-B 104B with telescope-B 106B, satellite-C 104C with telescope-C 106C, and satellite-D 104D with telescope-D 106D. Rotatable docking adapters 102A-102C enable on-orbit assembly, reconfiguration, and independent rotation of each satellite and its associated telescope. The base concept is formulated around points of view distributed about a central rotation axis 108. The constant and steady rotation allows for large area coverage and short revisit times without the need for repetitive pointing and settling times. In the illustrative example of FIG. 1, rotatable docking adapter 102A rotatably couples satellite-A 104A to satellite-B 104B, rotatable docking adapter 102B rotatably couples satellite-B 104B to satellite-C 104C, and rotatable docking adapter 102C rotatably couples satellite-C 104C to satellite-D 104D. All of the satellites are configured to rotate independently around the central rotation axis 108.

The station is a robotic system of systems with individual agents operated autonomously according to a mission plan, which can be adapted depending on observation requirements. When docked on the main station truss, the telescope payloads follow a common mission with Attitude and Orbit Control Systems (AOCS) tasked as leaders or followers. Yet each unit can function independently, as a separate spacecraft or as part of the superstructure. Any telescope payload can be tasked to specific mission objectives. Optics are standardized with off-the-shelf components assembled into a deployable structure. The use of the small satellites also follow concepts of modularity with the ability to change the FoV, imaging methods, and spectrum bands.

The robotic space station system 100 is designed to be a modular, autonomous, extensible, and transformative spacecraft with the ability to add, replace, or upgrade individual units. The lifetime of the station is only limited by the willingness to replace, add, and reconfigure the station to meet the requirements for changing missions and objectives.

Figure 2:
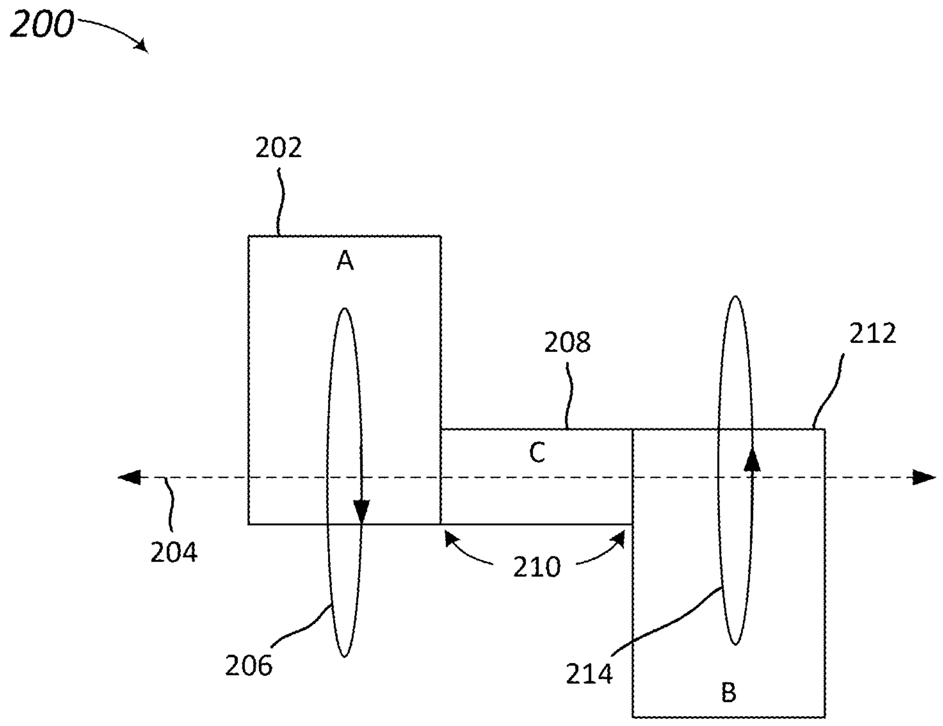
FIG. 2 is a schematic diagram of an example two-telescope configuration of a space station consistent with the present disclosure.

FIG. 2 is a schematic diagram of an example two-telescope configuration 200 of a space station consistent with the present disclosure. The configuration 200 includes two telescopes, telescope-A 202 and telescope-B 212, interconnected by module-C 208. The interconnecting module-C 208 includes one or more rotatable couplings 210 to couple the satellites to the space station while allowing the satellites to independently rotate about an axis of rotation 204. In this example configuration 200, telescope-A 202 is configured to rotate in a direction 206 and telescope-B 212 is configured to rotate in a direction 214.

The space station concept has the potential to perform "fast scanning," the ability for telescopes mounted on the station to independently scan large areas of the sky concurrently. In FIG. 2, telescope-A 202 and telescope-B 212 perform fast scanning by rotating, with telescope-A 202 rotating in a clockwise rotation and telescope-B 212 rotating in a counterclockwise rotation. It should be noted that the terms "clockwise" and "counterclockwise" are intended to indicate rotation of the two satellites in opposite directions, and not a specific direction of rotation. Module-C 208 connects telescope-A 202 and telescope-B 212. With telescope-A 202 and telescope-B 212 rotating in opposite directions, the net angular momentum of the space station system cancels out and remains zero. This is an important theoretical property of the space station as the scanning by the telescope segments can occur without adding angular momentum to the station which in turn means the angular momentum does not need to be dumped periodically using fuel consuming thrusters or use of mag-torquers in a magnetic field. Importantly the approach can lead to long lives for these stations as in typically situations when the station loses its ability to "zero-out" angular momentum through momentum-dumping, space station starts to uncontrollably tumble and hence loose its precise pointing capabilities to perform observation.

Figure 3:
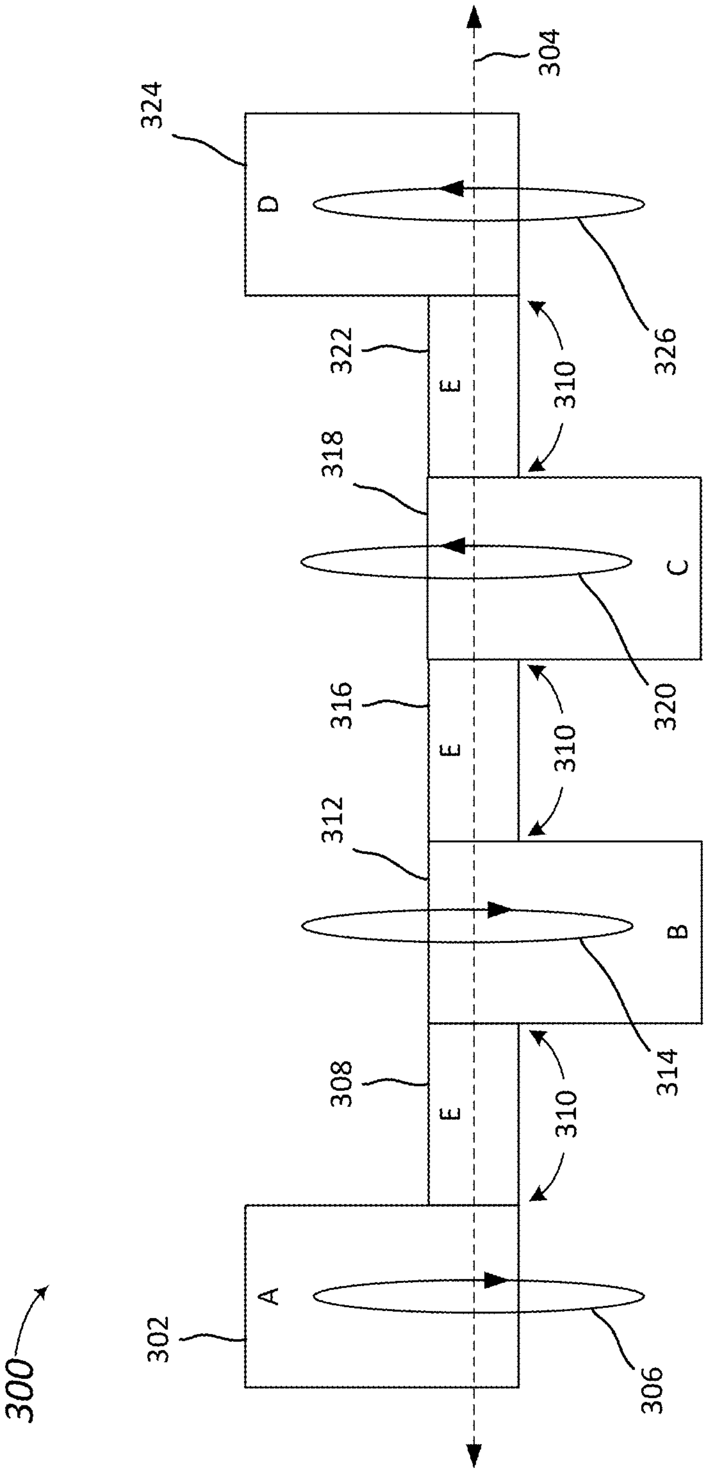
FIG. 3 is a schematic diagram of an example four-telescope configuration of a space station consistent with the present disclosure.

FIG. 3 is a schematic diagram of an example four-telescope configuration 300 of a space station consistent with the present disclosure. In the example of FIG. 3, the concept two-telescope configuration 200 in FIG. 2 is extended. Instead of two counter-rotating telescopes, the example embodiment of FIG. 3 includes four counter-rotating telescopes. The configuration 300 includes four telescopes, telescope-A 302, telescope-B 312, telescope-C 318, and telescope-D 324, interconnected by modules-E 308, 316, and 322. Each interconnecting module includes one or more rotatable couplings 310 to couple the satellites to the space station while allowing the satellites to independently rotate about an axis of rotation 304. In this example configuration 300, telescope-A 302 is configured to rotate in a direction 306, telescope-B 312 is configured to rotate in a direction 314, telescope-C 318 is configured to rotate in a direction 320, and telescope-D 324 is configured to rotate in a direction 326. In the example of FIG. 3, telescope-A 302 and telescope-B 312 rotate in the same direction, and telescope-C 318 and telescope-D 324 rotate in the same direction as each other, but in the opposite direction of telescope-A 302 and telescope-B 312, thereby cancelling out the net angular momentum of the space station system. Along the axis of rotation 304 there is a symmetry in rotation by the telescopes, since an equal number of telescopes are rotated in each direction, thereby minimizing any perturbations built-up in angular momentum.

Figure 4:
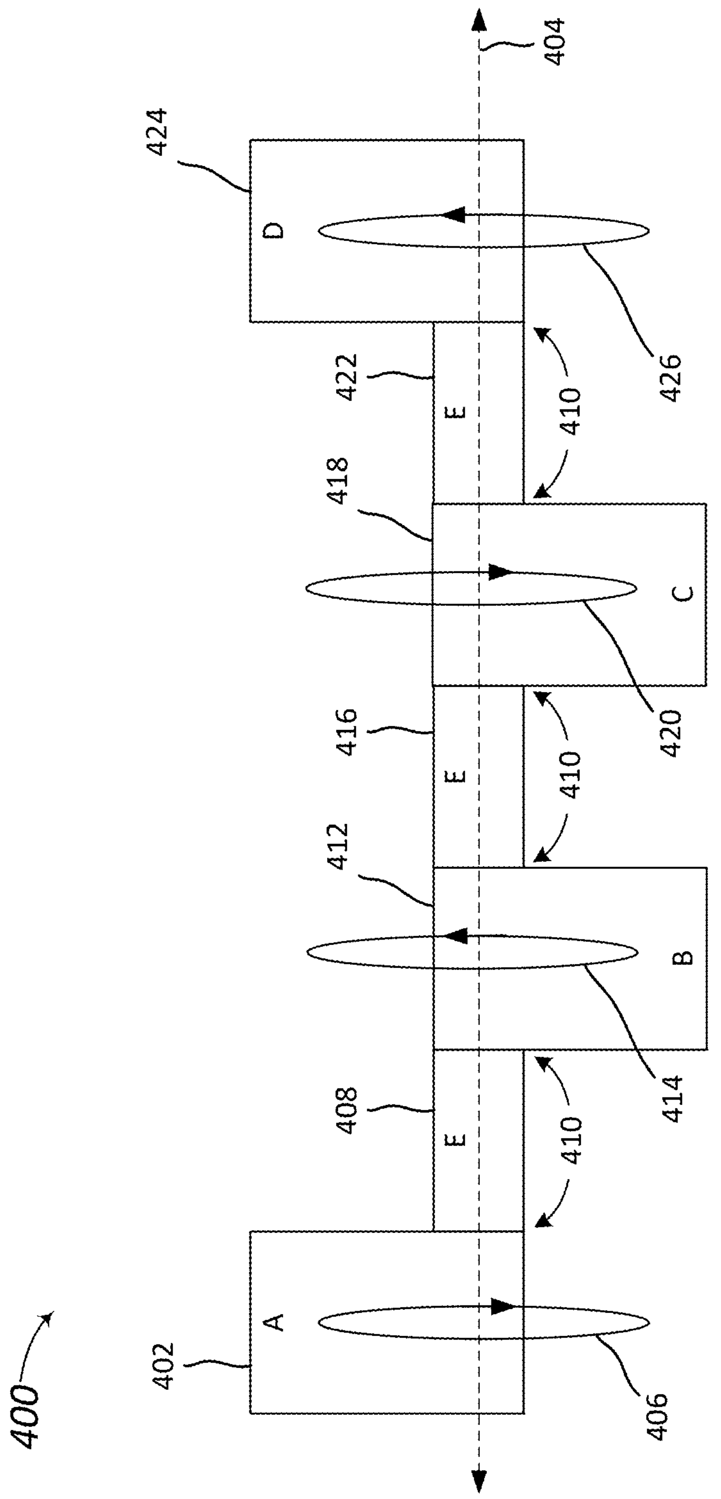
FIG. 4 is a schematic diagram of another example four-telescope configuration of a space station consistent with the present disclosure.

FIG. 4 is a schematic diagram of another example four-telescope configuration 400 of a space station consistent with the present disclosure. Like the example of FIG. 3, the configuration 400 includes four telescopes, telescope-A 402, telescope-B 412, telescope-C 418, and telescope-D 424, interconnected by modules-E 408, 416, and 422. Each interconnecting module includes one or more rotatable couplings 410 to couple the satellites to the space station while allowing the satellites to independently rotate about an axis of rotation 404. In this example configuration 400, telescope-A 402 is configured to rotate in a direction 406, telescope-B 412 is configured to rotate in a direction 414, telescope-C 418 is configured to rotate in a direction 420, and telescope-D 424 is configured to rotate in a direction 426. Whereas in the example of FIG. 3 telescope-A 302 and telescope-B 312 rotate in the same direction, and telescope-C 318 and telescope-D 324 rotate in the same direction as each other, but in the opposite direction of telescope-A 302 and telescope-B 312, in the example of FIG. 4, telescope-A 402 and telescope-C 418 rotate in the same direction, and telescope-B 412 and telescope-D 424 rotate in the same direction as each other, but in the opposite direction of telescope-A 402 and telescope-C 418, thereby cancelling out the net angular momentum of the space station system.

It should be noted that although the examples of FIGS. 2-4 have the rotatable couplings included in the interconnecting modules, in other embodiments the couplings in the interconnecting modules may be fixed and the couplings in the satellites containing the telescopes may be configured to rotate.

Figure 5:
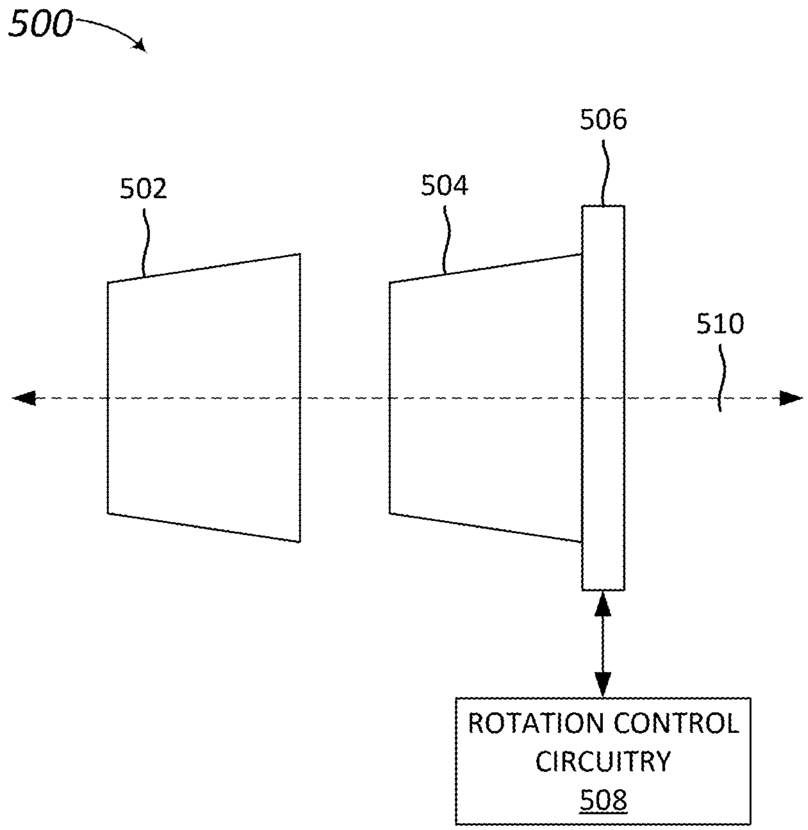
FIG. 5 is a schematic diagram of an example rotatable coupler for a space station consistent with the present disclosure.

FIG. 5 is a schematic diagram of one illustrative example embodiment of a rotatable coupler 500 for a space station consistent with the present disclosure. In an embodiment, the rotatable coupler 500 may be a docking adapter configured to couple two satellites to each other, or to couple a satellite to an interconnect module, such as interconnecting module-C 208 from FIG. 2, and further configured to allow the two satellites to rotate independently of each other. For example, one satellite may rotate in a clockwise direction, while the other satellite rotates in a counterclockwise direction.

In the illustrative example embodiment of the rotatable coupler 500 of FIG. 5, the coupler 500 consists of a first adapter 502 coupled to a first satellite and a second adapter 504 coupled to a second satellite, although either the first adapter 502 or the second adapter 504 may be coupled to an interconnect module rather than directly to another satellite. The second adapter 504 is rotatably coupled to a rotation device 506. In an embodiment, the second adapter 504 may be configured to rotate about the rotation device 506 along an axis of rotation 510. In another embodiment, the second adapter 504 may be fixedly coupled to the rotation device 506, and the rotation device 506 may be configured to rotate the second satellite in either a clockwise or a counter-clockwise direction with respect to the first adapter 502. In an embodiment, the rotation device 506 may include a bearing, which may further include a plurality of ball bearings, and/or a ring gear configured to couple with a matching gear in the first adapter to allow the rotation device 506 to rotate. One of skill in the art, however, will recognize that numerous coupling mechanisms exist to allow coupling the first satellite and the second satellite while allowing the first satellite and the second satellite to independently rotate relative to one another.

In an embodiment, the rotatable coupler 500 may include a rotation control circuitry 508 communicatively coupled with the rotatable coupler 506 and configured to control the rotation of the rotatable coupler 506. In an embodiment, the rotation control circuitry may include a controller, such as a microcontroller or microprocessor, a motor to rotate the rotatable coupler 506, motor control circuitry, position sensing circuitry, and communication circuitry to couple with the second satellite.

Two critical operational scenarios which significantly impact the logistics of a large-scale observational platform encompass nominal operations, specifically science operations involving observation, tracking, and resolution of events of interest. Subsequently, regular maintenance is instituted to address the repair or replacement of worn-out or damaged components and the system's response to off-nominal scenarios, leading to disaster management.

It should be noted that the following descriptions are illustrative examples of two possible scenarios. Many other possible scenarios and methods may exist for the space station, as would be known to one skilled in the art.

Figure 6:
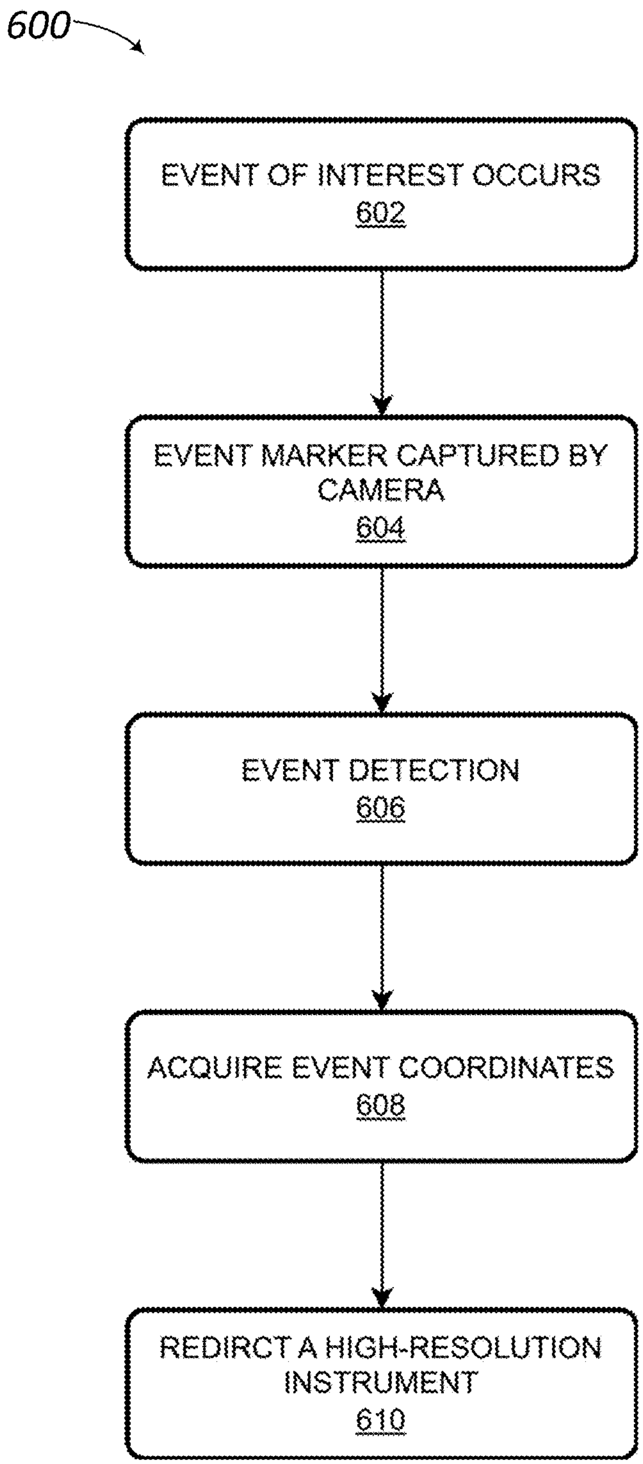
FIG. 6 depicts a flow diagram of an example scenario for redirection of instruments for a space platform, consistent with the present disclosure.

FIG. 6 depicts a flow diagram 600 of an example scenario for redirection of instruments for a space platform, consistent with the present disclosure. During this phase, the space surrounding the platform undergoes continuous monitoring for a user-defined set of events of interest using a suite of wide-angle cameras. Onboard machine learning algorithms continuously process the data to identify events, and following identification, medium-range cameras with higher resolution are deployed to track the events. The payload interface is designed to facilitate the gimbal motion of the cameras for tracking, and the decentralized planner controls both the instrument and the interface to execute the tracking. Subsequently, long-range telescopic systems are employed for further analysis.

In the example of flow diagram 600, an event of interest 602 occurs. For this example, an event with a predetermined marker (which would be specified by the operators of the instrument) occurs in cislunar space. The event marker is captured by a camera in block 604. In this example, one of the wide angle, i.e., wide FoV, cameras captures the marker of the event within its FoV. The event is detected in block 606, where the instrument controller recognizes the event marker captured by the wide angle camera. In block 608, the event coordinates are acquired by the instrument controller based on the pointing of the wide angle camera. Finally, in block 610, a high resolution instrument is redirected by the instrument controller to observe the event more closely.

Figure 7C:
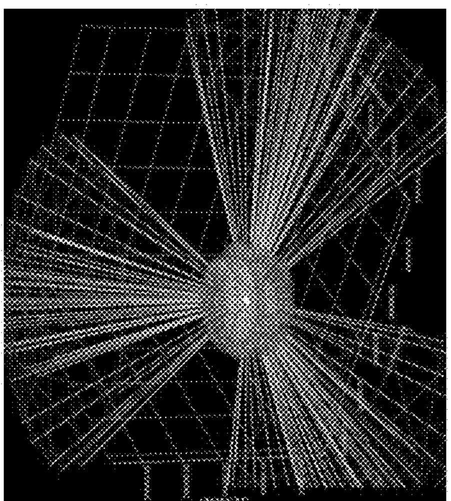
FIGS. 7A-7C are examples of camera field of view (FoV) and coverage during nominal operations.
Figure 7B:
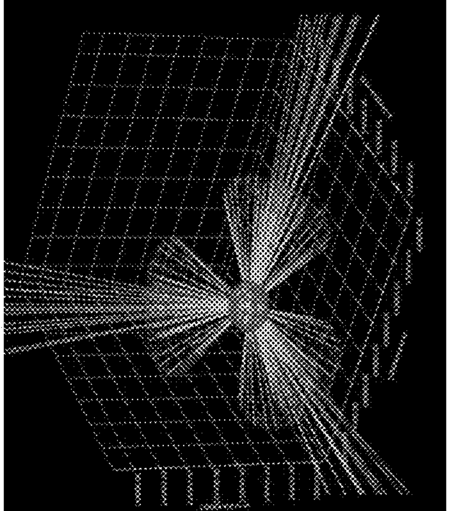
Figure 7A:
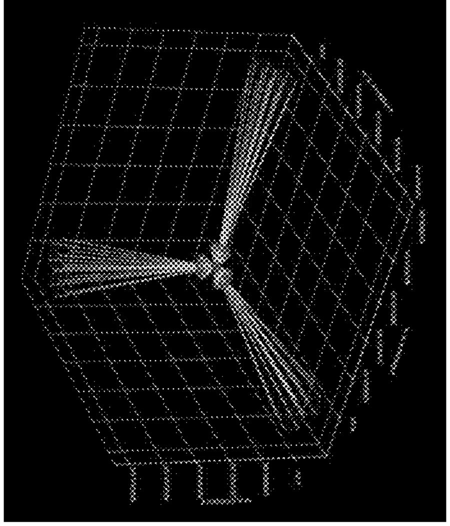

FIGS. 7A-7C are examples of FoV and coverage during nominal operations, with the FoV of the telephoto, medium range, and wide-angle camera suites shown in FIG. 7A, FIG. 7B, and FIG. 7C, respectively. There is a significant overlap between the FoV of the wide-angle cameras and the medium-range cameras, which covers the need for redundancy in coverage. The number and placement of the telephoto cameras, along with a suitable set of intrinsic parameters, need to be varied with the gimbaling capabilities of the payload interface to arrive at the optimum number of telephoto cameras needed for full coverage.

According to one aspect of the disclosure there is thus provided a robotic space station system, the robotic space station system including: one or more interconnecting modules; a plurality of small satellites. Each small satellite further including: one or more docking adapters; and one or more telescopes; where: each of the plurality of small satellites is rotatably coupled to at least one of the one or more interconnecting modules via the one or more docking adapters along a central axis; and the plurality of small satellites configured to rotate independently about the central axis.

According to another aspect of the disclosure, there is thus provided a rotatable coupler for a small satellite, the rotatable coupler including: a first adapter; and a second adapter, the second adapter rotatably coupled to a rotation device; and a rotation control circuitry communicatively coupled to the second adapter and configured to control a rotation of the rotatable coupler, where the rotation device configured to rotate the small satellite about an axis of rotation.

According to yet another aspect of the disclosure, there is thus provided a method for redirection of instruments for a space platform, the method including: capturing an event marker using a camera; detecting an event; determining coordinates of the event; and redirecting an instrument to the coordinates of the event.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

"Circuitry," as used in any embodiment herein, may comprise, for example, singly or in any combination, hardwired circuitry, programmable circuitry such as processors comprising one or more individual instruction processing cores, state machine circuitry, and/or firmware that stores instructions executed by programmable circuitry and/or future computing circuitry including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), application-specific integrated circuit (ASIC), programmable logic devices (PLD), digital signal processors (DSP), field programmable gate array (FPGA), logic gates, registers, semiconductor device, chips, microchips, chip sets, etc.

The term "coupled" as used herein refers to any connection, coupling, link, or the like by which signals carried by one system element are imparted to the "coupled" element. Such "coupled" devices, or signals and devices, are not necessarily directly connected to one another and may be separated by intermediate components or devices that may manipulate or modify such signals.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A robotic space station system, the robotic space station system comprising:

one or more interconnecting modules;

a plurality of small satellites, each small satellite further comprising:

one or more docking adapters; and one or more telescopes;

wherein:

each of the plurality of small satellites is rotatably coupled to at least one of the one or more interconnecting modules via the one or more docking adapters along a central axis; and the plurality of small satellites are configured to rotate independently about the central axis; and wherein the robotic space station system consists of an even number of satellites, a first half of the plurality of small satellites being configured to rotate in one direction along the central axis, and a second half of the plurality of small satellites being configured to rotate in an opposite direction along the central axis, thereby cancelling out a net angular momentum of the space station system.

2. The robotic space station system of claim 1, wherein the plurality of small satellites are disposed in a truss structure.

3. The robotic space station system of claim 1, wherein the plurality of small satellites are configured to be operated autonomously.

4. The robotic space station system of claim 1, wherein the one or more telescopes on each small satellite each point in different directions.

5. The robotic space station system of claim 1, wherein each of the one or more telescopes has an optical axis normal to the central axis of the robotic space station system.

6. The robotic space station system of claim 1, wherein the robotic space station system can reconfigure autonomously.

7. The robotic space station system of claim 1, wherein an equal number of the one or more telescopes are rotated in each direction about the central axis, thereby minimizing any perturbations built-up in an angular momentum of the robotic space station system.

8. The robotic space station system of claim 1, wherein each of the one or more interconnecting modules further comprises:

one or more rotatable couplings, the one or more rotatable couplings configured to urge each of the small satellites that are coupled to rotate about the central axis of the robotic space station system.

9. The robotic space station system of claim 1, wherein each of the one or more docking adapters further comprises:

one or more rotatable couplings, the one or more rotatable couplings configured to urge a small satellite coupled thereto to rotate about the central axis of the robotic space station system.

* * * * *